March 16, 1943.                C. W. AKERS                2,313,716
                            MOLDING APPARATUS
                           Filed April 6, 1942
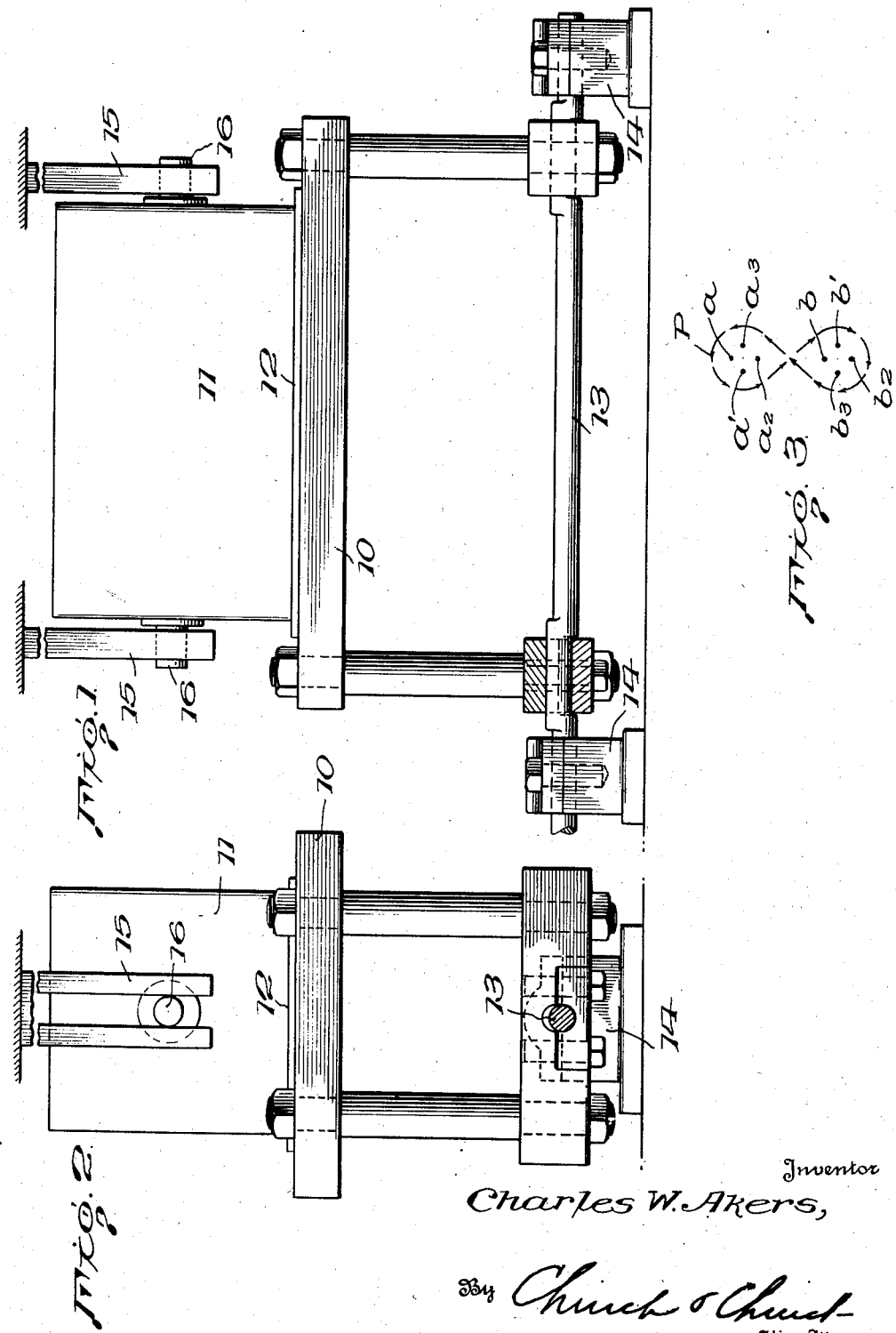
Inventor
Charles W. Akers,
By Church & Church
His Attorneys Patented Mar. 16, 1943

2,313,716

UNITED STATES PATENT OFFICE 2,313,716

MOLDING APPARATUS

Charles W. Akers, Nashville, Tenn.

Application April 6, 1942, Serial No. 437,883

4 Claims. (Cl. 25—41)

This invention relates to improvements in molding apparatus of the type wherein the mold for forming the desired article is vibrated to better compact the material from which the article is molded.

The primary object is to provide a molding apparatus in which the mold can be adequately vibrated without unduly stressing the structure of the apparatus.

Another object is to provide a mechanism for actuating the mold to properly compact the material therein without jarring or otherwise stressing the remaining structure of the apparatus.

Still another object is to provide an arrangement wherein the material in the mold will tend to be compacted laterally as well as vertically of the mold.

More specifically, the invention contemplates a mechanism wherein the mold and mold support are reciprocated and simultaneously rocked about a pivotal center, whereby the contents of the mold are compacted laterally and vertically of the mold and, in addition, no undue stresses are set up in the apparatus by reason of the change or reversal of the direction of movement of the mold and mold support.

With these and other objects in view, the invention consists in certain details of construction and combinations and arrangements of parts, all as will hereinafter be more fully described and the novel features thereof particularly pointed out in the appended claims.

In the accompanying drawing:

Figure 1 is a side elevational view of a molding apparatus embodying the present improvements;

Fig. 2 is an end view; and

Fig. 3 is a diagrammatical illustration of the path of movement of the mold.

While the present invention may well be embodied in various types of molding apparatus, a comparatively simple form of machine is disclosed in the present instance for illustrating the invention. As in all types of machines, there is the mold support or table 10 on which the mold 11 is releasably secured by means (not shown) which may take any desired form. In the present illustration, a pallet 12 is shown interposed between the mold 11 and the mold support 10 and, as is well understood, when each molding operation is completed, the mold is raised to clear the molded article (a molded tile in the present instance), so that the pallet with the article thereon can be removed from the support. Another pallet is then substituted, the mold placed thereon and filled with the tile material, and the molding operation repeated.

As previously indicated, it is desirable to vibrate the mold 11 to compact the material. In order to do this without effecting any abrupt reversals in the direction of movement of the mold, and in order to compact the material both laterally and vertically in the mold, the mold and mold support are actuated in the present apparatus in such fashion as to cause the material to be subjected to pressures along a path, as indicated by the arrows in Fig. 3. To produce this result, the mold support is carried by means capable of raising and lowering the support and also oscillating the lower portion of the support about a center above said lower portion, preferably located midway the height of the mold.

For instance, the frame of which the mold support or table is a part may be carried on the offset portions of a crank shaft 13 journaled in suitable bearings 14, and a vertical guideway 15 and co-operating guide member 16 may be provided at a suitable point above the crank shaft for guiding the table and mold in their vertical movements, while permitting them to be tilted first to one side and then the other as the offset portions of the shaft 13 pass through certain segments of their circular path. The guide members 16 may take the form of trunnions on the ends of the mold and the co-operating guideways 15 may be supported in any suitable fashion to maintain them substantially rigid, although it will be realized that these instrumentalities may be reversed and their location altered without departing from the spirit of the invention.

Referring again to Fig. 3, the effect produced on the mold and its contents by rotating crank shaft 13 is readily visualized. Assuming the offset portions of the shaft to be in their uppermost positions, as shown in Figs. 1 and 2, and assuming the shaft to be rotating in a clockwise direction, vertically spaced points above and below the center of the mold, indicated at $a$ and $b$ in Fig. 3, will move to the positions $a'$, $b'$ as the offset portions of the shaft assume a horizontal position upon the shaft making a one-quarter revolution. When the shaft has made a one-half revolution, the offset portions will occupy their lowermost positions and the points on the mold will have moved to the positions $a^2$, $b^2$. As the shaft completes the next quarter revolution, the offset portions will again be horizontally disposed and the points on the mold will occupy positions $a^3$, $b^3$, and, when the shaft completes its full revolution, those points will again be in their original locations a, b. Thus, as the mold is lowered, its top and bottom portions are tilted in opposite directions, and, when it is raised, those portions are tilted in reverse, opposite directions. The resultant of these forces, so far as concerns the material being molded, is substantially as indicated by the line of arrows P in Fig. 3, which produces a tendency of the material to become compacted, not only vertically of the mold, but also laterally thereof. The forces exerted on the mold support and mold by the crank shaft, in effecting the described movements of said support and mold, do not subject those parts to any excessive strains, such as are existant in apparatus where the mold is reciprocated back and forth in a substantially short path.

What I claim is:

1. In a molding apparatus for compacting material in a mold cavity, the combination of a mold box open at its top, a support on which said box is seated, means for vertically reciprocating and laterally rocking said support and box seated thereon, and co-operating guides and guideways at opposite ends of said box constituting the pivotal center on which the support and box is rocked and restraining lateral movement of said box and its support.

2. In a molding apparatus for compacting material in a mold cavity, the combination of a mold supporting table, a mold box open at its top and bottom seated on said table, said table closing the bottom of said box, mechanism for compacting material in the box comprising means for vertically reciprocating and laterally rocking said table and box seated thereon, guideways at opposite ends of the box, and guides projecting beyond the ends of said box into said guideways for limiting lateral movement of the box and table.

3. In an apparatus for molding tile blocks, a mold box open at its top for deposit of material therein, a supporting table on which said box is seated, and mechanism for compacting material in said box comprising means for reciprocating and rocking said box and table, co-operating guides and guideways at opposite ends of said table and box for limiting lateral movement of the table and box, and said box being open at its bottom and movable vertically off said table to strip said box from a block of material compacted therein.

4. In an apparatus for compacting material in a mold cavity in the form of tile, a frame comprising a mold supporting table, a crank shaft extending longitudinally of said frame and table, said frame being journaled on off-set portions of said shaft, a mold box open at its bottom positioned on said table, said box also being open at its top for deposit of material therein and for removal of a tile molded therein, and co-operating guide members at opposite ends of said box for limiting lateral movement of the box, said box being movable vertically from the table to remove it from a tile compacted therein.

CHARLES W. AKERS.